T. H. NEIKIRK.
IMPACT FILTER.
APPLICATION FILED AUG. 24, 1910.
1,000,540.
Patented Aug. 15, 1911.
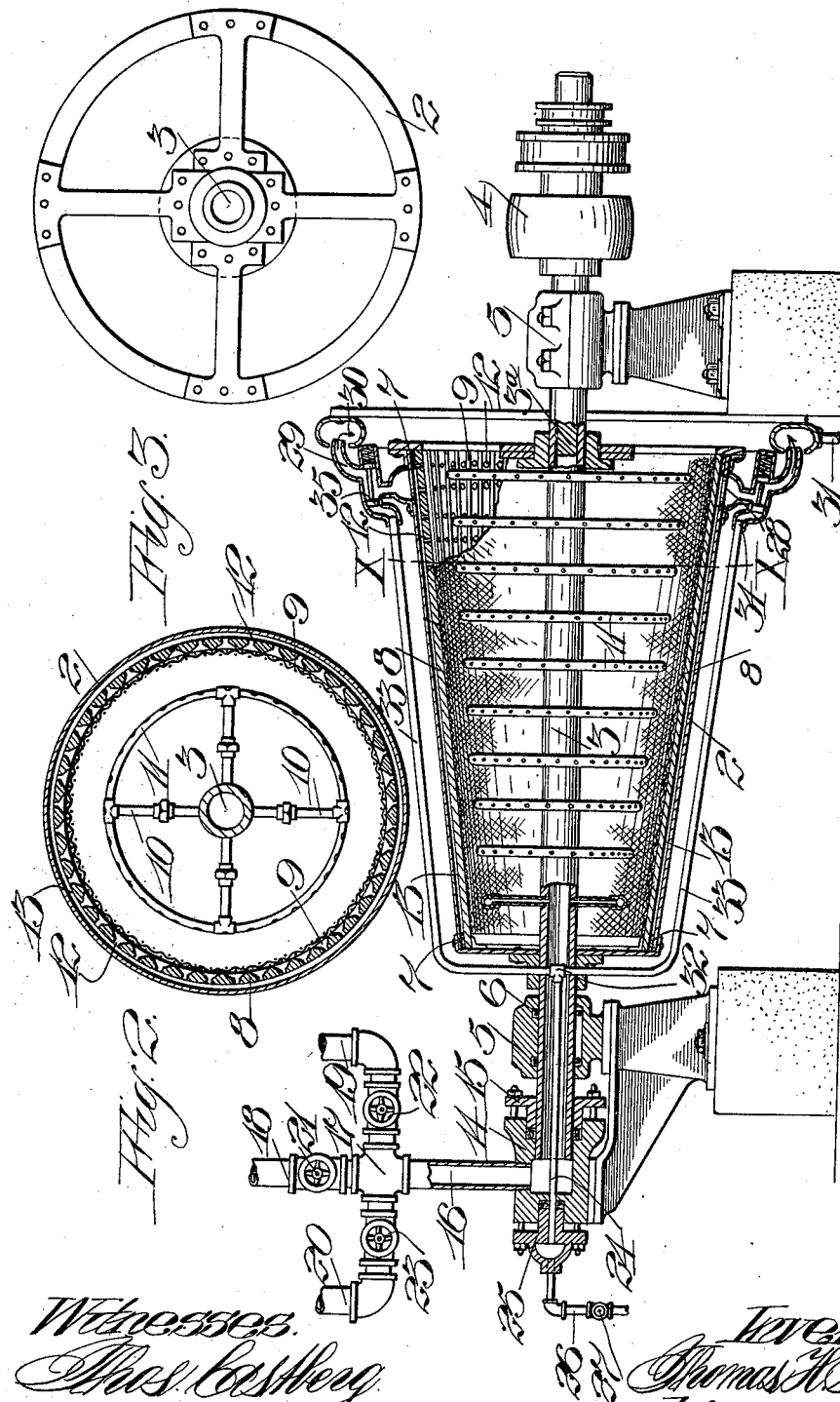

UNITED STATES PATENT OFFICE.

THOMAS HENRY NEIKIRK, OF MIDAS, NEVADA.

IMPACT-FILTER.

1,000,540.

Specification of Letters Patent. Patented Aug. 15, 1911.

Application filed August 24, 1910. Serial No. 578,732.

*To all whom it may concern:*

Be it known that I, THOMAS HENRY NEIKIRK, citizen of the United States, residing at Midas, in the county of Elko and State of Nevada, have invented new and useful Improvements in Impact-Filters, of which the following is a specification.

This invention pertains to filters, and particularly to filtering machines adapted for use in separating fluids from their sustained and contained solids.

The object of my invention is to provide a filtering apparatus of large capacity; for continuous operation; for simplicity and strength; and to provide an apparatus in which advantage is taken of rapid separation of fluids from solids due to impact against a filtering medium; and in the combination of means whereby the apparatus may be driven constantly during the filtering process, the washing process, and the cake discharging process.

The invention consists of the parts and the construction and combination of parts as hereinafter more fully described and claimed, having reference to the accompanying drawings, in which—

Figure 1 is a longitudinal vertical sectional view of the machine. Fig. 2 is a detail transverse section on line X—X. Fig. 3 is an end view of the machine.

In mining operations it is now an almost universal process to reduce the metal bearing ores to what are termed "slimes", forming a cyanid solution, and then to separate the cyanid solution to the fullest possible extent from the solid contents of the slime pulp by some method of filtration. Various methods have been introduced to accomplish this filtration of the value bearing solution, and much difficulty has been found in dislodging and removing the cake in an inexpensive, labor and time-saving manner. It is the desideratum to obtain a filtering machine wherein the processes of filtering may be performed as continuously as is possible without stopping the operation of the machine, and to so design the filtering machine that as little manual labor will be required for the discharging of the cake accumulating as a result of the filtration, as possible. I have devised a machine whereby to accomplish this desired economy and to increase the efficiency of the machine not only by saving the labor and time for the washing and cake removing steps, but also to be able to allow the apparatus to be continuously driven.

The representation here shown of my invention embodies a suitably shaped horizontally disposed drum 2, secured upon a hollow shaft 3 to rotate with the same. The drum may be disposed horizontally or vertically. Power to rotate the drum rapidly may be applied by suitable means, as a belt, and suitable driving mechanism as a clutch pulley 4, mounted upon one end of the shaft, supported in bearings 5—5, which may be provided with appropriate oiling devices, as rings 6.

The drum 2 may consist of a thin sheet of suitable material, within which at each end are secured bands 7, of suitable width and thickness, and upon these bands are supported a perforated lining 8, having any desired form of corrugated or irregular inner concaved surface, as at 9. Preferably the drum is made in the form of a truncated cone.

At intervals of eight inches, more or less, or at such distances as may be desired along the shaft 3, are sections of pipe 10 tapped or otherwise fastened thereto, and these pipes projecting radially form supports and connecting conduits for a plurality of circular pipes or distributers 11. The number of radial supports or pipes 10 connected to each individual ring 11 may be determined as conditions require, and the exterior periphery of the circular pipe 11 has a plurality of small holes drilled in the same so that a fluid may be discharged from the same forcibly outward in jet form, the force of the jet being enhanced by centrifugal action.

Over the inner roughened or corrugated surface of the lining 8, is placed a fabric of sufficient flexibility to naturally yield and conform to the corrugated or irregular surface of the lining, such as canvas or other material of suitable weight and mesh, against which the fluids projected through the rings 11 impact. The grooves of the filter leaf sections behind the canvas are provided with a series of perforations 12 at intervals so that the filtered liquid can pass through the filter leaf or sections 8 to the annular space 13, between the back of the filter leaf and the interior of the drum 2.

The outer end of the shaft 3 which is plugged at 3ª is rotatably mounted in a head 14, which is provided with a packing gland 15 to prevent the escape of fluids which are directed to the interior of the head 14 and thence through the hollow shaft 3 by means of a suitable stand pipe 16. At some convenient point in the stand pipe 16 is interposed a cross casting 17, projecting from which, in line with the stand pipe 16, is the pulp or slime feed pipe 18. On the opposite sides of the cross 17 are suitable supply pipes, as 19, for fresh water, and 20 for wash water, each of the pipes 18— 19 and 20 being controlled by its own respective valve 21, 22 and 23. Also passing through the head 14 and centrally and partially through the hollow shaft 3 is a pressure water conductor 24, which is designed to revolve in a packing gland 25 mounted in the head 14, water or other fluid under pressure being supplied to the packing gland and conductor 24 by a supply pipe 26, in which is mounted a controlled valve 27.

The operation of the machine is as follows:—The valve 27 should be closed and also the valves 23 connected to the wash-water tank, and the valve 21 connecting to the slime supply tank, and the valve 22 controlling the fresh-water supply. With these several valves closed the rotation of the drum is started by the transmission of power to the driving pulley 4 and the machine gradually brought up to speed. The valve 21 should now be opened so that the liquid to be filtered can pass down the stand pipe 16 and thence into the hollow shaft 3. The centrifugal force of the revolving shaft and arms throws the liquid to be filtered outwardly through the arms 10, and rings 11 from which it discharges through the perforations and against the filtering surface of the flexible fabric or lining 9 with considerable force and the impact causes an almost instantaneous separation of the solution from its contained solids, the solution passing through the filtering medium onto the grooved lining 8, and thence through the discharge perforations 12 into the channel 13 from which it is eventually discharged into an annular collector 28 which is secured on the outside of the shell to and adjacent its larger end, from which collector the solution is directed through a suitable conductor 29 into a vertically disposed launder 30, from which the filtered solution is constantly discharged by a drain pipe 31 by which it is conveyed to the zinc tanks in which the separation of the values takes place. The solids which are prevented from passing through the filtering medium accumulate upon the surface of the lining 9 and build up what is termed a "cake," on the filtering surface, and when a sufficient amount of liquid has been filtered, and a cake of suitable thickness has resulted, the valve 21 is closed, and the filtered fluid is discharged to the launder 30. The valve 23 is opened and wash-water is sent through the hollow shaft in the same manner as the pulp is fed through. The wash-water passing through the accumulated cake will carry through it any rich solution which it may possibly contain, and pass then into the collector 28, and be discharged into the launder 30. The valve 23 is now closed, and fresh or distilled water may be led into the tubular shaft 3 by the opening of the valve 22, so that the cake may be washed still further if desired. As before, the fresh water will pass through the filtering medium and may be collected by and discharged from the collector 28 into the launder 30. This much of the operation relates to the thorough filtration of the valuable cyanid solution from the cake, and when the cake has been thoroughly washed the valve 22 is closed and the cake may be removed from contact with the filtering medium and discharged from the drum. To accomplish this, the valve 27 is opened to allow the fluid under the requisite pressure to pass upwardly into the gland 25 and through the central revolving pipe 24, which terminates in a manifold 32 from which lead a plurality of conductors 33 outside of the drum 2. These conductors 33 are connected to the collector 28, as at 34, and the pressure of the fluid is designed to open automatic valves 35 mounted so as to cut off, when opened by the pressure of the fluid from the pipes 34, the flow outwardly through the conduits 29; thus the fluid under pressure is directed inwardly through the collector 28, and thence entirely around and filling the space 13 between the shell 2 and the back of the lining 8. When sufficient pressure has accumulated within the space 13 and passing through the perforations 12 in the linings 8 it will exert force upon the flexible filtering medium 9 to dislodge the adhering cake, and this will break and fall against the distributing rings 11. The inpouring of the water under pressure through the filtering medium 9 will accumulate in sufficient quantities within and upon the bottom of the drum 2 to rapidly carry the dislodged and disintegrated cake outwardly at the lower open end of the drum 2. The valve 35 is designed to automatically reseat when the pressure of fluid in the pipe connection 34 is decreased, and when the machine is again performing its function of filtering the solution, this may pass freely outwardly through the collector 28 and past the stem of the valve 35 without interference.

The machine may be revolved continuously during the process of filtering and cake-renewing and the drum need never stop at any time during any of the above operations, although the speed is suitably regulated during discharge to enable the removal of the cake.

The utilization of the forces generated by the impact of the slimes as they escape from the distributer rings 11 and strike the filtering medium 9 is important in that there is more rapid separation of the fluid from the solids. This results in an increased efficiency and in an increase in the capacity per unit of the filter area, due to the method of introducing the liquid upon the filtering surface, and in the saving of time and labor for the removal of the cake. Another important feature, which may here be mentioned, is the relative size of the present apparatus to the common filtering devices now employed, in proportion to the volume of filtered solution produced.

Having thus described my invention, what I claim and desire to secure by Letters Patent, is—

1. A horizontally disposed, revoluble, conoidal, imperforate drum, a filter lining therein with a discharge duct formed between the lining and the shell of the drum, and means for delivering the material to be separated forcibly against the said filtering lining, said means comprising a revoluble feed pipe carrying a plurality of annular distributers within and at points along the drum.

2. A revoluble, conoidal, imperforate drum, a filter lining therein with a discharge duct formed between the lining and the shell of the drum, and means revoluble with the drum for delivering the material to be separated forcibly against the filtering lining, said means comprising a revoluble feed pipe carrying a plurality of annular distributers within and at points along the drum.

3. A filter comprising a revoluble hollow shaft, journals supporting said shaft, a shell secured thereon, a filtering lining secured within the shell, rings interposed between the shell and the linings whereby a space is formed between the same, and means for the discharge of a solution against the lining of the shell, said means comprising a plurality of annular distributers carried by said shaft and positioned at successive points along the interior of the drum.

4. A filter comprising a hollow shaft, a drum secured on said shaft, bearings upon which the shaft may revolve, a filter medium secured to and spaced slightly from the interior of said drum, and means secured to said shaft whereby a pulp may be discharged against the inner surface of the filtering medium, said means comprising a plurality of annular distributers carried by said pipe and positioned at successive points along the interior of the drum.

5. A filter comprising a hollow shaft, a drum open at its ends secured upon said shaft, means for revolving the shaft, means for supporting the same, a lining secured to and spaced from the interior surface of the shell, a plurality of annular distributers spaced along the shaft, and means whereby the pulp is delivered to said distributers.

6. A filter comprising a conical drum, a perforated lining mounted upon the interior of the drum, a filtering medium secured to said lining, means whereby the drum may revolve, said means including a hollow shaft, and a plurality of annular distributers connected to the shaft and adapted to discharge a fluid against the surface of the filtering medium.

7. A filter comprising a shell, a hollow shaft, a lining secured within the shell and spaced therefrom, said lining being perforated and corrugated and supporting a filtering medium, and means whereby the shell is revolved, and means whereby a fluid is delivered to impact against the surface of the filtering medium, said last named means including a plurality of annular distributers placed side by side along the length of the interior of the drum and revoluble with said drum.

8. A filter comprising a hollow shaft, means for revolving said shaft, journals therefor, a shell secured upon said shaft, linings secured to and spaced from the interior of the shell, a flexible filtering medium supported upon said linings, distributers connected to and spaced along the shaft, means whereby a fluid may be delivered through the shaft and to the distributers, said means including a fixed packed head, and a stand pipe for collecting the filtered material passing through the filtering medium.

9. A filter comprising a hollow shaft, means for revolving said shaft, journals therefor, a shell secured upon said shaft, linings secured to and spaced from the interior of the shell, a flexible filtering medium supported upon said linings, series of annular distributers connected to and spaced along the shaft, means whereby a fluid may be delivered through the shaft and to the distributers, said means including a fixed packed head, a stand pipe for collecting the filtered material passing through the filtering medium, and an annular launder adapted to receive the filtered solution as it is discharged from the revolving drum.

10. A filter comprising a hollow shaft, a drum secured thereon and revoluble therewith, a series of annular distributers within said drum and fixed to said shaft, a corrugated perforated lining secured to and spaced from the inner surface of the drum, a filtering medium resting upon said corrugated surface, an annular collector communicating with the space between the shell and the lining, said collector having discharge nozzles, and an annular stationary launder adapted to receive the solution as it is discharged from the revolving collector.

11. A filter comprising a hollow shaft, a plurality of spaced distributers secured to the shaft and communicating with the interior thereof, a drum secured upon the shaft, an inner perforated lining secured and spaced from the drum, a filtering medium supported upon the inner surface of the lining and against which a pulp impacts as discharged from the distributers, means for discharging the filtered solution from the drum, and means whereby the resultant cake of solids may be dislodged from the filtering medium.

12. A filter comprising a hollow shaft, a plurality of spaced distributers secured to the shaft and communicating with the interior thereof, a drum secured upon the shaft, an inner perforated lining secured to and spaced from the drum, a filtering medium supported upon the inner surface of the lining and against which a pulp impacts as discharged from the distributers, means for discharging the filtered solution from the drum, and means whereby the resultant cake of solids may be dislodged from the filtering medium, said means including a plurality of conduits connected to the shaft and to the drum, whereby a fluid under pressure may be turned into the space between the shell and the lining for the purpose of dislodging the packed cake from the filtering medium.

13. A filter comprising a tubular shaft, a drum secured to said shaft, a perforated corrugated lining secured to said drum so as to form a space between the inner surface of the drum and the outer surface of the lining, a filtering medium supported upon the corrugated surface of said lining, a plurality of spaced annular perforated distributers secured to said shaft, and communicating with its interior, means whereby a pulp solution may be conveyed to the interior of the shaft, a collector secured to the drum and communicating with the space between the shell and the lining, a stationary launder adapted to receive the discharged filtered solution from the revolving drum, means whereby the supply of solids to the interior of the hollow shaft may be controlled, means for supplying a wash-water to the interior of the shaft and distributers, means for dislodging the resultant cake from the interior of the drum, said means including conductors adapted to deliver a fluid under pressure to the collector, and means whereby the escape of said pressure fluid is prevented and directed to the interior of the drum and behind the perforated lining for the purpose of dislodging the cake.

In testimony whereof I have hereunto set my hand in the presence of two subscribing witnesses.

THOMAS HENRY NEIKIRK.

Witnesses:
ROBT. M. HORTON,
H. E. DRISCOLL.

---

Copies of this patent may be obtained for five cents each, by addressing the "Commissioner of Patents, Washington, D. C."